United States Patent [19]

Harris et al.

[11] 4,074,565

[45] Feb. 21, 1978

[54] VIBRATORY-WIRE STRAIN GAGE

[75] Inventors: Richard K. Harris, Seattle; (Charles) Bill (William) Jewsbury, Bellevue; Dale W. Shoup, Edmonds, all of Wash.

[73] Assignee: The Slope Indicator Company, Seattle, Wash.

[21] Appl. No.: 769,543

[22] Filed: Feb. 17, 1977

[51] Int. Cl.² ............................................. G01B 7/16
[52] U.S. Cl. ............................. 73/88.5 R; 73/DIG. 1
[58] Field of Search ........................ 73/88.5, DIG. 1

[56] References Cited

U.S. PATENT DOCUMENTS

| 2,805,482 | 9/1957 | Schonstedt | 73/88.5 X |
| 2,935,709 | 5/1960 | Paine | 73/88.5 X |
| 3,245,018 | 4/1966 | Russell | 73/88.5 X |
| 3,675,474 | 7/1972 | Browne et al. | 73/88 E |

FOREIGN PATENT DOCUMENTS 1,068,154  5/1967  United Kingdom ........... 73/DIG. 1

Primary Examiner—Charles A. Ruehl

[57] ABSTRACT

A vibratory-wire strain gage has mounting flanges integral to the instrument for disposition of the wire and its low-profile casing in intimate, substantially coplanar relation to the measuring surface.

6 Claims, 7 Drawing Figures

U.S. Patent  Feb. 21, 1978  4,074,565
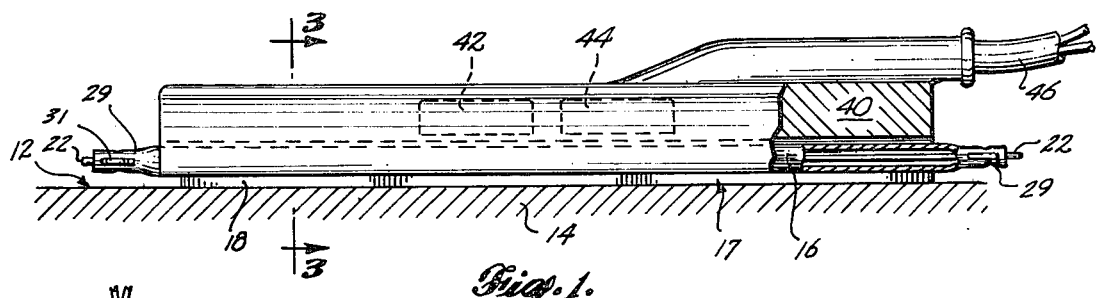
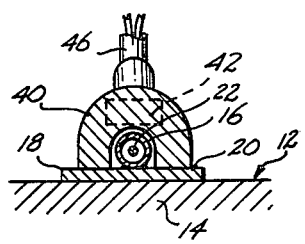
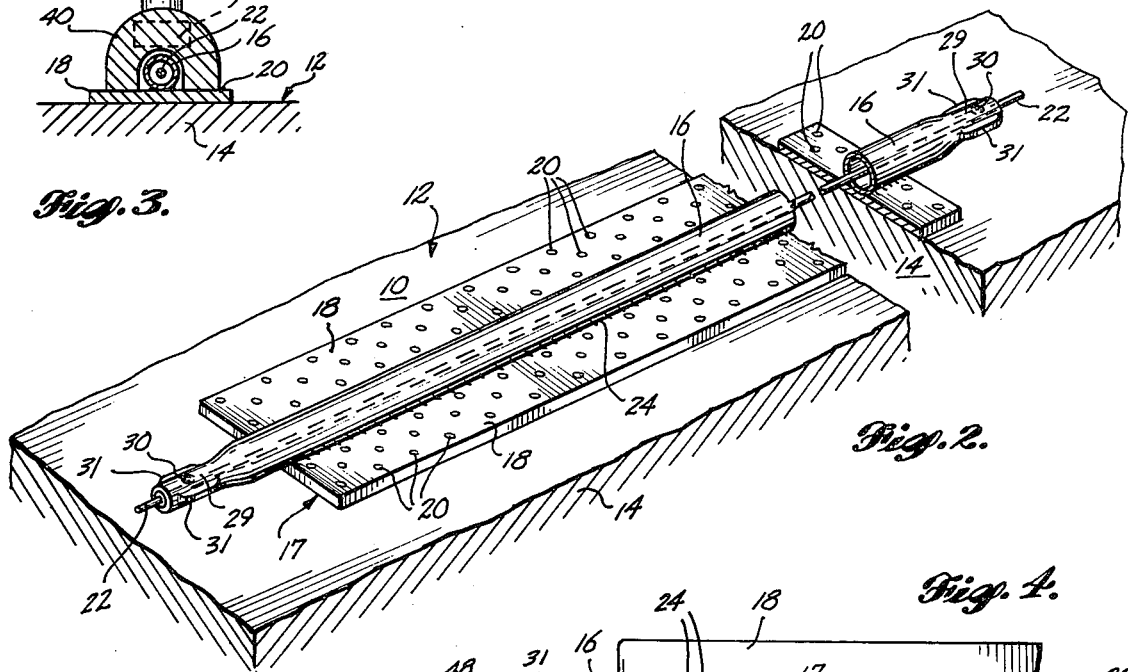
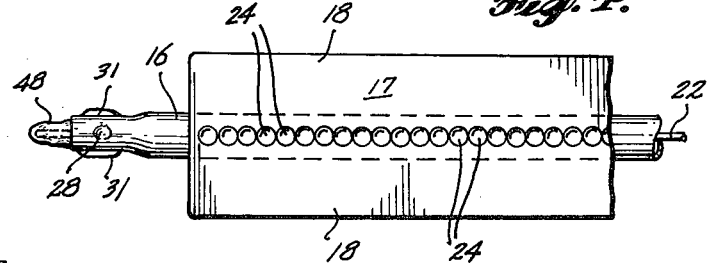
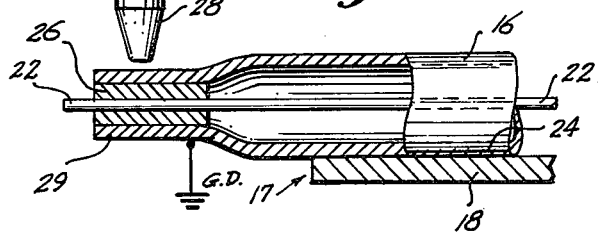
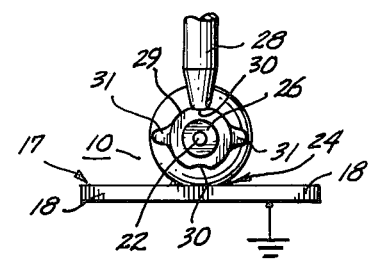
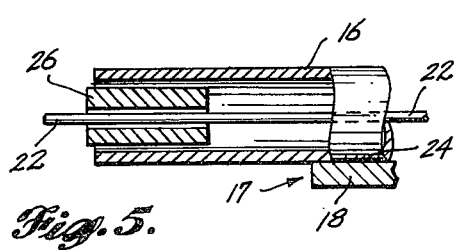

VIBRATORY-WIRE STRAIN GAGE

FIELD OF THE INVENTION

Strain gages of various types have come to be recognized instruments for determining the magnitude and distribution of stress and strain in all manner of constructions. Among the several types that have been adopted and used by engineers are the vibratory-wire strain gages and electrical resistance strain gages. The latter type gages are usually very thin, and, when used for surface strain measurements, may be bonded by the use of adhesives or cement directly to the measuring surface, presenting a low, unobtrusive profile. However, resistance gages do present some disadvantages: installation costs are usually quite high; severe amounts of drift and error have been noted, tending to restrict their use to short-term installations; they are subject to corrosion and are vulnerable to lead wire problems. On the other hand, vibratory-wire strain gages are generally free of lead wire problems; are, as currently produced, generally not subject to drift and error; and have relatively high long-term accuracy; but they usually present a high profile when installed which displaces the acoustic vibrating element an undesirable, non-intimate distance from the measuring surface due to their large size. Also, as currently produced, vibratory-wire gages require extreme care in their installation with respect to orientation and mounting requirements.

BACKGROUND OF THE INVENTION

The use of vibratory-wire strain gages (sometimes called acoustic strain gages) has become very widespread during the past several decades. They are used as remote reading gages for the purpose of measuring many physical factors in fabricated metallic structures, in rock or in concrete constructions. Factors that are measured include surface and internal stresses and strains, deflections, displacement, fluid levels, angular changes and temperatures. As a form of transducer, a vibratory-wire gage is particularly attractive for such purposes because it is generally the most reliable and accurately sensed of the several strain gages available. Because their measuring principle is based on a mechanical value, vibratory-wire gages are unaffected, as opposed to electrical resistance gages (sometimes called bonded strain gages) by variations of electrical current, voltage, resistance or capacitance. The sensed signals of a vibratory-wire gage, derived by means of an inductive pickup system and comprising an electric signal with a specific frequency, can be transmitted over great distanced without interference or loss of signal frequency. However, vibratory-wire strain gages have not heretofore had the compactness such that the wire is disposed in close, intimate relation to the measuring surface.

Essentially, a vibratory-wire strain gage comprises a small wire, anchored at its ends, under predetermined tension. The end anchors for the wire are affixed to the object under load and tend to separate or approach each other as the object is subjected to force variations. The wire is usually spaced an appreciable distance from the measuring surface. When testing of a structural member so equipped is being conducted, the tensioned wire is "plucked". That is, the wire is artificially vibrated, by means of an electromagnetic impulse. The resonant frequency of the vibrating wire is detected by an electromagntic sensor or pickup located in close juxtaposition to the wire. An electric signal produced at the sensor is conducted, usually some distance, to a remote read-out apparatus where it is amplified and processed into a signal that suitably actuates frequency-counting means normally including digital display means.

In most if not all installations, the plucking means and sensing means are permanently associated with the gage. Input and feedback conductors extend from the gage to a central site where an operator or engineer employs the readout unit in the conduct of his testing. Distances between the gages and the testing or read-out station may be great — many hundreds of feet in some cases. In other cases where the gages are easily accessible, an operator manually applies his exciter/sensor to the gages and makes his reading at its situs.

In designing vibratory-wire strain gages to meet the demands that they be constantly accurate over long periods of time and waterproof, the prior designers have produced gages of sizes and configurations that now appear to be unnecessarily complex, bulky and overly expensive. Commercially available wire gages range in length from four to fourteen inches, and stand out from the structure to which they are mounted from one to four inches due to the common practice of surface-mounting vibratory-wire gages in posts or mounting blocks located at the ends of the gage. Usually, such mounting of the older wire gages is accomplished by reliance on an alignment template that establishes and maintains a determined orientation and holds the posts or brackets while they are being fixed in place. It is a prime object of this invention to provide a vibratory-wire gage that requires no posts or mounting blocks. Another object of this invention relating elimination of posts and blocks is to eliminate the necessity of employing alignment templates while avoiding problems arising from misalignment.

With gages surface-mounted on structural building elements such as beams or columns, the end posts or other supports are commonly welded or bolted in place with proper spacing and alignment so that the gage may subsequently be positioned therein. Installation of the posts or brackets usually takes from 15 to 30 minutes per gage. Such mounting practices requiring considerable care and skill are necessarily time-consuming and expensive.

It is an important object of this invention to provide an exceptionally low-profile vibratory-wire gage capable of immobile installation in from 5 to 10 minutes by resort to simple and quick tack-welding techniques.

In gage installations using end supports, the wire under tension is normally encased in a sealed tube for protection from the elements. The tube ends are generally tightly clamped or secured in the supports. As a result of such mounting practices the wire is necessarily spaced an appreciable distance from the surface of the member to which it is attached. If the measuring surface under the wire is subjected to bending, the strain measurements may be inaccurate since they are taken from a wire vibrating in an axis appreciably offset from the measuring surface. Also, deflection or bending of the supports causes additional inaccuracy and aggravates hysteresis effects. Because of these and other factors, vibratory-wire strain gages are not used as frequently or in as many places as the testing engineers would prefer. It is also, then, an important object of this invention to provide a vibratory-wire strain gage in which the wire is offset only a few thousandths of an inch from the measuring surface which avoids the use of end supports, thereby increasing accuracy in the strain measurements.

With post or block-mounted gages it is common practice to finally tension the wire after it and its usual encasing tube are mounted in the post or blocks. Pre-setting the tension of the wire in such gages does not appear to be accomplished practically prior to mounting. This means that in the field, initial wire tensioning and frequency determinations are made gage-by-gage, often under very adverse conditions. It is still a further object of this invention to not only produce a vibratory-wire gage surface for mounting which can be sent to the field for installation with substantially uniform wire tension (i.e., frenquency) characteristics, but also one that will retain the initial wire tension during installation and for a long time thereafter.

Having the foregoing in mind, it becomes apparent that among the several objects of this invention have been to provide a vibratory-wire strain gage which is simple to manufacture and is capable of being manufactured with close tolerances as to wire strain or tension; which permits the disposition of the wire in extremely close proximity to the measuring surface and which eliminates the mounting posts and bulky mounting and protective apparatus of the prior art, and which may be easily installed without resort to templates, or highly skilled workers or supervisors.

Other objects and advantages will become apparent during the course of the following description of a preferred embodiment of the invention.

DESCRIPTION OF THE DRAWINGS

FIG. 1 is a side view of a vibratory-wire strain gage according to this invention;

FIG. 2 is an enlarged perspective view of a gage as it appears installed at a point of use, portions being broken away for convenience of illustration;

FIG. 3 is a cross-section taken on line 3—3 of FIG. 1;

FIG. 4 is a partial bottomside view of a gage;

FIG. 5 is a longitudinal sectional view of an end of a gage at an intermediate stage in its manufacture;

FIG. 6 is also a longitudinal sectional view of a gage end at an advanced stage in its manufacture; and FIG. 7 is an end view taken as in plane 7—7 of FIG. 6.

DESCRIPTION OF A PREFERRED EMBODIMENT

In FIGS. 1 and 3 the vibratory-wire strain gage 10 is shown mounted on the measuring surface 12 of a base member 14 which may be a part of any of numerous structural or constructional elements under applied stresses or strains which are to be determined.

The gage 10 comprises an elongated tubular member 16. Laterally-extending mounting flange 18, 18 disposed along each side of the tubular member 6 are provided by strip 17 for securing the gage to base member 14. As shown in FIG. 2, securement of flanges 18 to the measuring surface 12 is preferably obtained by use of a spot-welding device (not shown) which is caused to make a series of spot-welds 20 along flanges 18, 18 on both sides of tube 16.

Strap or metallic strip 17 is secured throughout its length to tube 16 by a continuous series of welding spots 24 as best shown in the bottomside view of FIG. 4. It has been found that satisfactory joinder between tube 16 and strip 17 is obtained by applying approximately 30 tack-weld spots per lineal inch. When properly attached, strip 17 stiffens tube 16 and resists any tendency of the tube to bow or otherwise deflect under normal conditions.

Tube 16 encloses wire 22 which extends throughout the length of the tube and beyond. In the manufacture of the gage 10, tube 16 is first secured to strip 17 as described. Thereafter wire 22 is threaded through and out the ends of tube 16 and also through a sleeve 26 at each end. Each sleeve 26 is sized at this stage to loosely receive a wire end and to be slipped into a tube end as shown in FIG. 5. The wire is not gripped at its ends when it is being tensed.

Wire 22 normally is selected from a source of heat-treated, high tensile strength steel wire. It is preferable that is coefficient of expansion and contraction be relatively closely matched to that of any structural member to which the gage is to be attached.

While the wire is untensed, a first end of tube 16, a sleeve 26 and the wire 22 is placed between opposed concave grooves of die. When the die closes, the tube ends and the sleeves within them are squeezed and swaged and tapered as shown at 29 in FIG. 2. The tube and sleeve then collapse into intimate gripping contact with the wire end passing therethrough, the sleeve 26 centering the wire 22 coaxial of tube 16. Excess tube material forms flashes 31 at the sides of the collapsed tube ends. Then the other or second end of the tube is presented to the grooves of the die and is similarly swaged, which results in wire 22 being placed under tension. Tension attained may at that time be electronically checked with ease. Ordinarily at this stage tension in wire 22 will be found to be approximately 2200 Hz. or slightly less. If tension is too low, the gage is returned to the die and nipped inward slightly of the first swaging to increase tension. Occasionally excess tension is relieved by rapping the end of the gage sharply which tends to compress the gage in a longitudinal direction a minute amount.

It is preferable that base strip 17 and tube 16 be of a reasonably ductile stainless steel alloy to impart corrosion resistance properties to the gage. On the other hand, for strength and stability reasons it is preferable that wire 22 be of heat-treated steel having a high tensile strength. Because the exposed ends of wire 22 in certain installations may be exposed to corrosion from water or salt air or the like, it has been found desirable to apply a small cap 48 of epoxy resin material as shown in FIG.4. This not only protects the wire end but seals if necessary the ends 29 of the collapsed tube and the sleeve 26 therein.

The spot or tack welding system of attaching the gage 10 to a measuring surface 12 as described results in the gage being immovably mounted. No "creep" can occur as can often be the case when a gage is secured to the measuring surface by adhesive means.

The vibratory-wire strain gage of this invention will be seen from the foregoing to have many advantages, some of which are:

low profile easily shielded for protection;

imitimate disposition of the vibratory-wire relative the measuring surface;

easily waterproofed;

simplicity and economy of manufacture;

stability of wire tension, hence long and useful life; and all the benefits of vibratory-wire gages of bulkier constructions.

On occasion it has been found expedient and desirable to place the reduced tube ends between an opposed pair of welding electrodes 28, 28 and apply current to produce spot fusions 30. Any excess of wire 22 protruding from reduced ends 29 may be snipped off.

When the gage 10 is to be surface mounted, it is placed at a chosen location on a measuring surface 12 of metallic base 14. By means of conventional spot or tack welding apparatus, the flanges 18, 18 being grounded are securely welded to the base 14 by a myriad of spot welds 20 (see FIG. 2). The gage then is capable of responding to strains in either tension or compression of the member on or in which it is mounted.

A plucker device 40 of conventional nature is placed at the mid-portion of the gage 10. By exciting an electromagnetic plucking coil 42 in plucker 40, the tensed wire 22 is "plucked", i.e., mechanically caused to vibrate. The frequency of vibration thus induced is sensed by an inductive pickup coil 44 in a coil magnet sensor which converts the mechanical oscillation of the wire into an electric signal. Both the current to activate coil 42 and the induced signal are conveyed by means of cable 46. In a read-out measuring unit the induced signal is processed for display and observation, visually as by use of a digital counter, or aurally. Plucker 40 may be permanently associated with gage 10 as where the same is embedded in a mass such as concrete, or placed at remote and practically inaccessible location. Or it may be unconnected from the gage, and when in use manually applied to readily accessible gages.

The physical characteristics of a preferred vibratory wire acoustic strain gage according to this invention are:

| | |
|---|---|
| Wire (22) gage | 0.01 inch |
| Tube (16) length | 2.65 inches |
| Tube (16) diameter | 0.062 inch |
| Base strip (17) width | 0.3 inch |
| Base strip (17) thickness | 0.007 inch |
| Base strip (17) length | 2.5 inches |
| Initial wire tension | 2200 Hz. + 100 Hz. |
| Gage weight | circa 1.2 gram |
| Sensitivity | circa 1 micro-inch/inch |
| Space between measuring surface and wire at rest | circa 0.03 inch |
| Distance between measuring surface to summit of the sensor Plucker | circa 0.625 inch |

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. A vibratory-wire strain gage, comprising:
   an elongated metallic base strip adapted for rigid attachment to a structural member;
   a metal tube having one side rigidly fused to said strip along its length;
   a vibratory-wire extending coaxially through said tube in spaced apart relation to the inner wall thereof;
   each end of said tube being collapsed into squeeze-gripping relation to the wire end therein; and
   said wire having a predetermined tension which is maintained by said gripping relations.

2. A strain gage according to claim 1 in which the fusedtogether base strip and tube have a modulus of elasticity comparable to that of a structural member with which said gage is rigidly associated for strain determinations.

3. A strain gage according to claim 1 in which the spacing of the axis of said wire under tension relative the bottomside of said base strip is between about 1/32 inch and about ⅛ inch.

4. A strain gage according to claim 1 in which there is a sleeve surrounding each end of said wire within an end of the tube and each said tube end, and said sleeve is collapsed into gripping relation to the wire end therein.

5. A strain gage according to claim 4 in which each collapsed tube end and sleeve therein is fused together.

6. A strain gage according to claim 1 in which said tube is longer than said base strip and each tube end extends beyond the related strip end.

* * * * *